US006296266B1

United States Patent
Martin

(12) United States Patent
(10) Patent No.: US 6,296,266 B1
(45) Date of Patent: Oct. 2, 2001

(54) MOTORCYCLE TRAINING WHEELS APPARATUS

(76) Inventor: Jeffrey A. Martin, 820 8$^{th}$ Pl., De Motte, IN (US) 46310

( * ) Notice: Subject to any disclaimer, the term of this patent is extended or adjusted under 35 U.S.C. 154(b) by 0 days.

(21) Appl. No.: 09/267,736

(22) Filed: Mar. 15, 1999

(51) Int. Cl.$^7$ .................................................. B62H 1/12
(52) U.S. Cl. ........................... 280/293; 280/767; 180/209
(58) Field of Search ..................... 280/293, 294, 280/295, 755, 767, 763.1, 298, 299, 300, 301, 302, 303, 149.2; 180/209

(56) References Cited

U.S. PATENT DOCUMENTS

| 1,186,695 | 6/1916 | Slocomb . | |
|---|---|---|---|
| 1,358,252 | * 11/1920 | Schneider | 180/209 |
| 3,198,546 | 8/1965 | Hopkins . | |
| 3,863,945 | 2/1975 | Dustan . | |
| 4,133,402 | 1/1979 | Soo Hoo . | |
| 4,181,190 | * 1/1980 | Yang | 180/219 |
| 4,203,500 | * 5/1980 | Kamiya | 180/219 |
| 4,511,155 | * 4/1985 | Galloway | 280/204 |
| 4,826,194 | 5/1989 | Sakita . | |
| 4,961,477 | 10/1990 | Sweeney . | |
| 5,029,894 | 7/1991 | William . | |
| 5,772,223 | 6/1998 | Letourneau . | |
| 5,826,900 | * 10/1998 | Steele | 280/291 |
| 5,984,339 | * 11/1999 | Guild | 280/402 |

FOREIGN PATENT DOCUMENTS

| 2613-988 | * 10/1988 | (FR) | 280/293 |
|---|---|---|---|
| 2-3585 | * 1/1990 | (JP) | 280/293 |
| WO 84/00337 | * 1/1990 | (WO) | 280/293 |

* cited by examiner

Primary Examiner—J. J. Swann
Assistant Examiner—David R. Dunn
(74) Attorney, Agent, or Firm—George Pappas

(57) ABSTRACT

A training wheels apparatus for a motorcycle including a frame assembly which is detachably attachable to the U-shaped members of the motorcycle whereat the motorcycle foot pegs are normally pivotally attached. A pair of wheels are rotatably supported on the frame assembly. When attached, the training wheels apparatus is located generally below the motorcycle seat and between the motorcycle front and back wheels. The foot pegs are pivotally attached to the training wheels apparatus at a location substantially close to where the foot pegs are normally pivotally attached to the motorcycle frame. When the training wheels apparatus is detached from the motorcycle frame, the foot pegs are pivotally reattached to motorcycle frame at their normal in use location.

20 Claims, 2 Drawing Sheets

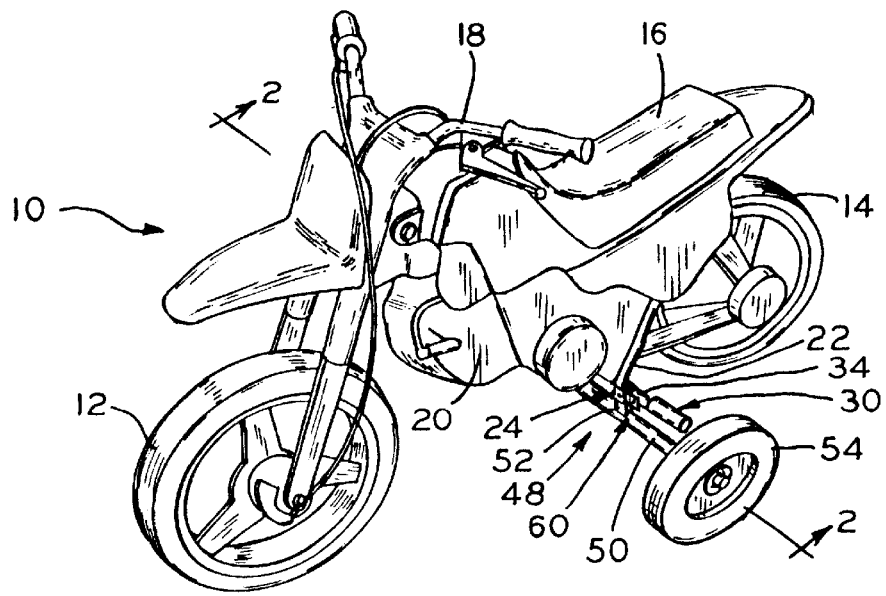
FIG_1
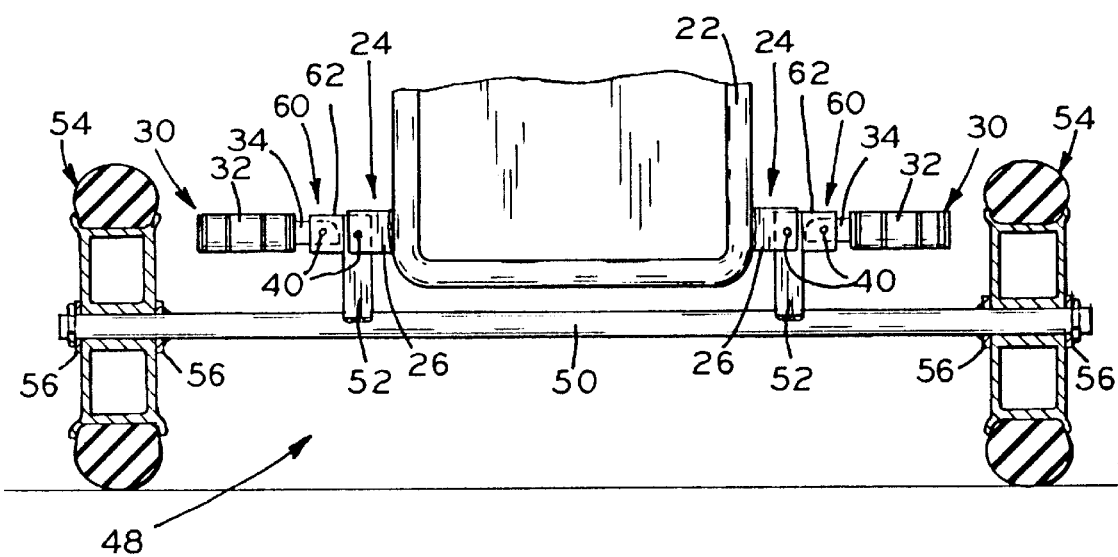
FIG_2

MOTORCYCLE TRAINING WHEELS APPARATUS

FIELD OF THE INVENTION

The present invention relates to the field of training wheels for use on motorcycles. More particularly, the present invention relates to training wheels which are selectively detachably attachable to a motorcycle.

BACKGROUND OF THE INVENTION

Motorcycles today are quite commonly used for transportation as well as recreation and competition. People riding motorcycles vary in age from very young to quite old. To meet the public demand, motorcycle manufacturers manufacture various smaller scale motorcycles intended for younger smaller children. Quite often a young child may not yet know how to ride a two-wheel cycle or may not have yet mastered riding a two-wheel cycle sufficiently well enough to ride the smaller scale motorcycle. As can be appreciated, it is also difficult for a young child to learn the effective operation of the various components and controls, i.e., brake, throttle, etc.

Accordingly, a need exists for an apparatus usable with a motorcycle for supporting and preventing the motorcycle from tipping over until the rider has effectively learned how to ride the two-wheel motorcycle as well as how to effectively control the various mechanical components thereof.

SUMMARY OF THE INVENTION

It is the principal object of the present invention to provide a motorcycle training wheels apparatus for use on motorcycles of any size and all age groups, however, primarily for smaller scale children size motorcycles.

It is further the object of the present invention to provide a motorcycle training wheels apparatus which is generally inexpensive to manufacture, but which is efficiently and effectively detachably attachable to the motorcycle and which reliably prevents the motorcycle from tipping during use.

The present invention overcomes disadvantages associates with prior motorcycle training wheels apparatuses and achieves the above-mentioned and other objects of the invention by providing a frame assembly whereupon a pair of wheels are rotatably supported and wherein the frame assembly is detachably attachable to the motorcycle frame at a location generally below the motorcycle seat between the motorcycle front and back wheels and at a location on the motorcycle frame generally whereat the motorcycle foot pegs are detachably attachable to the motorcycle frame. The frame assembly includes an axle whereupon the pair of wheels are rotatably supported. A pair of fingers are attached to the axle and extend upwardly therefrom. The fingers include stubs which are located so as to selectively be received within the motorcycle U-shaped members whereat the motorcycle foot pegs are normally pivotally attached.

More specifically, the motorcycle foot pegs U-shaped members each include a pair of ears having aligned holes and a portion of the foot pegs having a hole therethrough is normally received between the ears. A pin is selectively inserted and extends through the ear holes and the foot peg hole thereby rotatably supporting the foot pegs. When attaching the training wheels apparatus, the motorcycle foot pegs are first removed from the U-shaped members and the frame assembly is appropriately located for placing the finger stubs into the U-shaped members and between the respective ears. The stub holes are aligned with the ear holes and a pin is inserted therethrough thereby solidly attaching the frame assembly, axle, wheels, etc., to the motorcycle frame.

The frame assembly includes second U-shaped members preferably located substantially near the finger stubs. These U-shaped members are essentially identical to the motorcycle U-shaped members having a pair of ears with aligned holes. The foot pegs are selectively detachably attachable to the second U-shaped members of the frame assembly by similarly locating the foot pegs end portions in the U-shaped members between the ears, aligning the ear holes and foot peg holes, and inserting a pin therethrough, thus, pivotally attaching the foot pegs at the second U-shaped members. As can be appreciated, the foot pegs are pivotable between an in use horizontal position and an out of use vertical position just like when they are attached to the U-shaped members on the motorcycle frame. Furthermore, these pivotal connections are substantially near the normal pivotal connections to the motorcycle except only slightly horizontally displaced thus appearing and feeling to the rider as if there is no difference and as if the foot pegs are at the same location as when the training wheels apparatus is removed and the foot pegs are attached to the motorcycle frame U-shaped members.

In one form thereof, the present invention is directed to a training wheels apparatus for a motorcycle having a set of foot pegs which are detachably attachable to the motorcycle frame. The training wheels apparatus includes a pair of wheels rotatably supported on a frame assembly. The frame assembly is detachably attachable to the motorcycle frame at a location generally whereat the foot pegs are detachably attachable to the motorcycle frame.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a perspective view of a children's small scale motorcycle whereupon a training wheels apparatus constructed in accordance with the principles of the present invention is attached;

FIG. 2 is a partial cross sectional view taken generally along line 2—2 in FIG. 1;

Corresponding reference characters indicate corresponding parts throughout the several views of the drawings.

Figure 3:
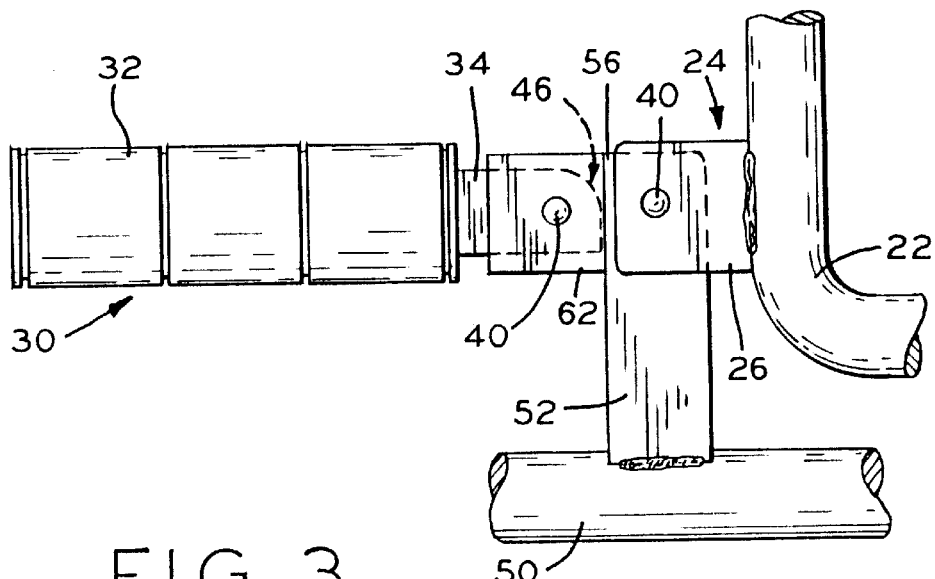
FIG. 3 is a front elevation view of a part of the training wheels apparatus shown in FIG. 1 attached to the motorcycle frame; and, FIG. 4 is an exploded perspective view of the portion of the training wheels apparatus shown in FIG. 3.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENTS

Referring initially to FIG. 1, a children's smaller scale motorcycle is shown and generally designated by the numeral 10. Motorcycle 10 includes front and back wheels 12 and 14, seat 16, steering handle bars 18, etc., as is most common with all motorcycles. Motorcycle 10 further includes a gas powered engine 20 for selectively driving back wheel 14 in a known and customary manner. Motorcycle 10 also includes a frame typically made of steel tubing 22 bent and/or welded together so as to form the motorcycle frame and support the various components in a known and customary manner.

Figure 4:
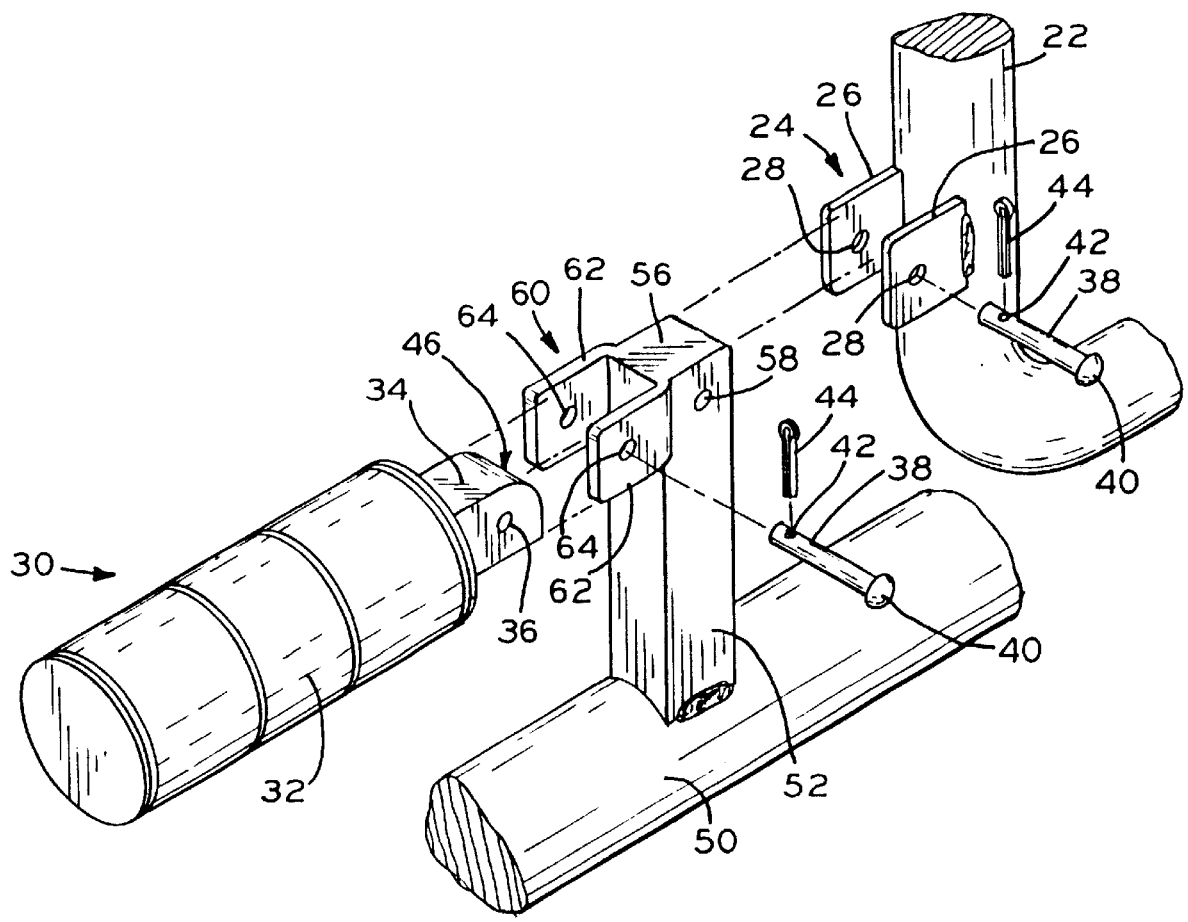

On the left and right sides of motorcycle 10, U-shaped members 24 are provided and are attached to the frame steel tubing 22 as shown. U-shaped members 24 each typically include a pair of ears 26 made of steel and attached to the motorcycle frame steel tubing 22 by welding or other suitable means. Ears 26 each include a hole 28 which are aligned with one another as best seen in FIG. 4.

The U-shaped members 24 are normally provided on the motorcycle frame steel tubing 22 for pivotally attaching the foot peg 30. That is, foot pegs 30 are typically provided having an exterior rubber sleeve 32 and an end portion 34 having a hole 36 extending therethrough. Foot pegs 30 are typically attached to the U-shaped members 24 by placing the end portion 34 thereof between ears 26 and aligning holes 28 of ears 26 with the hole 36 of the end portion 34 and, thereafter, inserting and extending a steel pin 38 therethrough. Pin 38 includes a head 40 at one end and a small hole 42 at its other end. After inserting pin 38 through holes 28 and 36, a cotter pin 44 is placed through the small hole 42 and is bent in a known and customary manner for effectively preventing pin 38 from inadvertently being removed. Further, as best seen in FIGS. 3 and 4, the foot peg end portion 34 has a rounded upper end 46 so that foot peg 30 is selectively rotatable about an axis of rotation collinear with pin 38 but limited between a horizontal position, as for example, shown in FIG. 3 and a vertical position (not shown).

A training wheels apparatus constructed in accordance with the principles of the present invention is generally designated in the drawings by the numeral 48 and is shown in FIGS. 1 and 2 attached to the motorcycle 10. Training wheels apparatus 48 includes a frame assembly preferably including an axle 50 and fingers 52 attached to axle 50 and extending perpendicular therefrom. Axle 50 and fingers 52 are preferably made of steel and fingers 52 are attached to axle 50 by welding or other suitable means. It is noted that the term "frame assembly" herein is intended to describe not only the preferred assembly as shown in the drawings but also any other assembly of component parts whereupon two wheels may be rotatably supported and which is attached to the U-shaped members 24 as described hereinbelow.

As shown in FIGS. 1 and 2, a pair or wheels 54 are rotatably supported on axle 50 and are prevented from sliding longitudinally along the axle by stop members 56. The length of axle 50 and, thus, the distance of wheels 54 extending away from the motorcycle frame steel tubing 22 is sized depending on the size of the motorcycle 10 so as to effectively prevent motorcycle 10 from tipping.

At the upper end or stub 56 of each finger 52, a hole 58 is provided and extends through the finger 52. The width of the finger 52 is substantially similar to the width of end portion 34 of foot peg 30 so that the stub 56 of fingers 52 can be selectively received within the U-shaped member 24 and between ears 26. After placing the stubs 56 within the U-shaped portions 24 as best seen in FIGS. 2 and 3 and aligning the ear holes 28 with the finger or stub hole 58, a pin 38 is inserted and extends therethrough for effectively attaching the training wheels apparatus frame assembly to the motorcycle frame tubing 22. It is noted that the length of fingers 52 and the diameter of wheels 54 are sized relative to the motorcycle 10 such that, when the rider sits on the motorcycle and causes the support springs and shock absorbers thereof to contract, the wheels 54 are lowered or located for contacting the ground and effectively supporting and preventing the motorcycle 10 from inadvertently tipping over.

As discussed, prior to attaching the training wheels apparatus 48 to the motorcycle frame tubing 22, the foot pegs 30 are removed from the U-shaped members 24. However, after the training wheels apparatus 48 is attached to the motorcycle frame tubing 22, the foot pegs 30 are reattached to the frame assembly of the training wheels apparatus 48 in a position substantially similar or close to the position they were in when pivotally attached to the motorcycle frame tubing 22. In this regard, a second U-shaped member 60 is preferably provided on each finger 52 near stubs 56 thereof U-shaped members 60 are similarly made up of ears 62 having aligned holes 64 therethrough sized to receive a pin 38. Ears 62 are made of steel and are attached to fingers 52 by welding or other suitable means. The width or distance between ears 62 is the same as the width or distance between ears 26 for receiving therebetween the end portion 34 of foot pegs 30. Thus, as shown, foot pegs 30 are pivotally reattached within the U-shaped members 60 similar to the manner they are attached to U-shaped members 24 when training wheels apparatus 48 is not utilized so as to pivot between a horizontal position as shown in FIG. 3 and a vertical position (not shown). More specifically, the end portion 34 of foot pegs 30 are placed between the ears 62 for aligning holes 64 of ears 62 with hole 36 of end portion 34 and inserting and extending a pin 38 therethrough. A cotter pin 44 is preferably used by inserting through the small hole 32 and bending for effectively preventing the pin 38 from inadvertently being removed.

As shown in the drawings, when foot pegs 30 are reattached to the training wheels apparatus 48 they are essentially at same location or near the location whereat they were when pivotally attached to the motorcycle frame tubing 22, except slightly longitudinally away therefrom. Thus, although the training wheels apparatus 48 is attached to the motorcycle 10, the foot pegs 30 are nevertheless located substantially at the same location and feel and look to the rider as if no training wheels apparatus is being used.

Finally, it is noted that after the child or rider becomes comfortable in riding and controlling the motorcycle, the training wheels apparatus 48 is merely removed or detached from the motorcycle frame tubing 22. This process simply requires the removal of cotter pins 44 and pins 38 for detaching the training wheels apparatus frame 48 from the motorcycle frame tubing 22 and also detaching the foot pegs 30 from the training wheels apparatus fingers 52. The foot pegs 30 are then reattached to the motorcycle frame tubing 22 at U-shaped members 26 placing them in the position they were initially located for normal use.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A training wheels apparatus in combination with a motorcycle having a set of foot pegs which are detachably attachable to the motorcycle frame, the training wheels apparatus comprising:

a training wheels frame;

said training wheels frame including foot pegs;

a pair of wheels rotatably supported on said training wheels frame; and, wherein said training wheels frame is detachably attachable to said motorcycle frame at the location whereat said foot pegs are detachably attachable to the motorcycle frame.

2. The combination of claim 1 wherein the motorcycle frame includes a set of U-shaped members attached to the motorcycle frame whereat each foot peg is detachably attachable thereto, and wherein said training wheels frame is selectively detachably attachable to the U-shaped members.

3. The combination of claim 2 wherein said training wheels frame includes a set of fingers each selectively received in a respective U-shaped member.

4. The combination of claim 3 wherein each of the U-shaped members comprises a pair of ears having aligned holes and said training wheels frame fingers each have a stub with a hole extending therethrough, each said finger stub being selectively received in a respective U-shaped member between said U-shaped member ears with said stub hole and ear holes aligned, and further wherein a pin is selectively inserted and extends therethrough.

5. The combination of claim 4, wherein the motorcycle foot pegs are detachably attachable to the training wheels frame.

6. The combination of claim 5 further comprising a set of second U-shaped members on said training wheels frame, each of the foot pegs being selectively detachably attachable to a respective second U-shaped member.

7. The combination of claim 6 wherein said second U-shaped members each comprise a pair of ears having aligned holes and each of the foot pegs have a hole extending therethrough, the foot pegs being selectively received in a respective second U-shaped member between said ears with said foot peg hole aligned with said ears holes and a second pin being selectively received and extending therethrough.

8. The combination of claim 7 wherein said foot peg is selectively pivotable about said second pin.

9. The combination of claim 8 wherein said training wheels frame includes an axle attached to each of said fingers, said wheels being rotatably supported on said axle.

10. The combination of claim 2 wherein the motorcycle foot pegs are detachably attachable to said training wheels frame.

11. The combination of claim 10 wherein the foot pegs are pivotable about an axis of rotation between said foot pegs and said training wheels frame.

12. The combination of claim 3 wherein said training wheels frame includes an axle attached to each of said fingers, said wheels being rotatably supported on said axle.

13. The combination of claim 5 wherein the foot pegs are pivotable about an axis of rotation said training wheels frame.

14. The combination of claim 1, wherein the motorcycle foot pegs are detachably attachable to the training wheels frame.

15. The combination of claim 14 further comprising a set of second U-shaped members on said training wheels frame, each of the foot pegs being selectively detachably attachable to a respective second U-shaped member.

16. The combination of claim 15 wherein said second U-shaped members each comprise a pair of ears having aligned holes and each of the foot pegs have a hole extending therethrough, the foot pegs being selectively received in a respective second U-shaped member between said ears with said foot peg hole aligned with said ears holes and a second pin being selectively received and extending therethrough.

17. The combination of claim 16 wherein said foot peg is selectively pivotable about said second pin.

18. The combination of claim 14 wherein the foot pegs are pivotable about an axis of rotation between said foot pegs and said training wheels frame.

19. The combination of claim 18 wherein said training wheels frame includes an axle attached thereto, said wheels being rotatably supported on said axle.

20. The combination of claim 1 wherein said training wheels frame includes an axle attached thereto, said wheels being rotatably supported on said axle.

* * * * *

UNITED STATES PATENT AND TRADEMARK OFFICE
CERTIFICATE OF CORRECTION

PATENT NO. : 6,296,266 B1
DATED : October 2, 2001
INVENTOR(S) : Jeffrey A. Martin Page 1 of 1

It is certified that error appears in the above-identified patent and that said Letters Patent is hereby corrected as shown below:

Claim 13,
Line 14, after "rotation" insert -- to --.

Signed and Sealed this

Second Day of April, 2002

Attest:

Attesting Officer

JAMES E. ROGAN
Director of the United States Patent and Trademark Office